United States Patent Office 2,776,983
Patented Jan. 8, 1957

2,776,983

ACETOACETYLAMINO COMPOUNDS AND A PROCESS OF MAKING SAME

Hans Schenkel, Neue Welt, near Basel, and Max Aeberli, Basel, Switzerland, assignors to Durand & Huguenin A. G., Basel, Switzerland, a Swiss firm No Drawing. Application August 18, 1952, Serial No. 305,066

Claims priority, application Switzerland August 21, 1951

13 Claims. (Cl. 260—377)

It is known that diketene may be reacted with certain amino compounds in the presence of an inert solvent at elevated temperature with the formation of acetoacetyl-amino compounds; thus, for example, in U. S. Patent No. 1,982,675 the manufacture of acetoacetanilide from diketene and aniline in the presence of toluene at 50–70° C. is described.

It is also known that, instead of inert solvents, water can also be used, provided that the reaction between the diketene and the amino compound is carried out at a low temperature, since at elevated temperature diketene and water themselves react together. This process is of commercial utility and it is possible, in accordance therewith, to bring into reaction amino compounds which are insoluble in organic media, such as, for example, amino sulphonic acids, amino carboxylic acids and the like.

There is, however, still a large number of amino compounds which either cannot be reacted at all by one or the other of the above processes or only with insufficient yields of the acetoacetylamino compounds. These amino compounds include, for example, the primary mono-aminoanthraquinones and the primary diaminoanthraquinones, and the substitution products thereof, as well as the secondary diarylamines, certain aminobenzene sulphonic acid amides and heterocyclic compounds containing a secondary nitrogen atom in the heterocyclic nucleus.

The present invention is based on the observation that in good yield N-acetoacetyl derivatives of amino compounds are obtained by reaction of primary and secondary aromatic amines or of heterocyclic compounds containing a secondary nitrogen atom in the heterocyclic nucleus with diketene, when the reaction is carried out in 90–100 percent acetic acid, preferably glacial acetic acid, and within the temperature range of 40–80° C., preferably 60–70° C.

The process of this invention for the manufacture of N-acetoacetyl derivatives of amino compounds, by the reaction of a primary or secondary aromatic amine and of heterocyclic amines containing a secondary nitrogen atom in the heterocyclic nucleus with diketene is accordingly characterised by the fact that the reaction is carried out in 90–100 percent acetic acid at a temperature of 40–80° C.

It was in no way to be expected that the reaction of an amino compound with diketene in highly concentrated acetic acid, or in glacial acetic acid, would give rise to the acetoacetyl compound, since it is known that diketene reacts with aliphatic or aromatic carboxylic acids at 10–100° C. with the formation of the corresponding acid anhydrides (cf. U. S. Patent No. 2,476,859).

The process of the invention is suitable for the manufacture of N-acetoacetyl derivatives of primary or secondary, purely aliphatic, aliphatic-aromatic or purely aromatic amines and also of heterocyclic compounds containing a secondary nitrogen atom in the heterocyclic nucleus and gives valuable dyestuff intermediates, which may be used more particularly for the production of azo dyestuffs, such as acetoacetanilide azo dyestuffs and the like.

In particular, by means of the process of this invention, those amino compounds can be converted into the corresponding acetoacetyl compounds, which according to the already known processes cannot be converted, or only in poor yield, into the corresponding acetoacetyl compounds. Such amino compounds include, for example, 1-aminoanthraquinone, 1 - amino-4-benzoylaminoanthraquinone, 1-amino-5-benzoylaminoanthraquinone, 1-amino-4-phenylaminoanthraquinone, 2-aminoanthraquinone, 2-amino-1-chloranthraquinone, 2 - amino-3-chloranthraquinone; 1:4-diaminoanthraquinone, 1:5-diaminoanthraquinone benzidine naphthoquinone

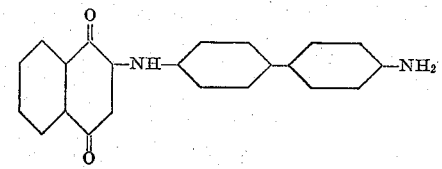

1-aminobenzene-4-sulphonic acid morpholide, 1-aminobenzene - 4-sulphonic acid-p-phenylanilide, 1-aminobenzene-4-sulphonic acid dimethylamide, 1-amino-4-sulphonic acid-thiazolyl-(2')-amide, 4-aminodiphenyl sulphone, diphenylamine, 4-benzoylaminodiphenylamine, N-1-naphthyl-N-phenylamine, N-2-naphthyl-N-phenylamine, naphthosultam and carbazole.

It has been ascertained that the amino compounds need not be soluble in highly concentrated acetic acid or in glacial acetic acid; they can also be brought into reaction in suspension. In certain cases it may be desirable, when the reaction is complete, to maintain the reaction mixture for some time at a temperature exceeding 80° C.

The following examples illustrate the invention, without limiting the same, the parts being by weight:

*Example 1*

22.3 parts of 1-aminoanthraquinone are suspended in 200 parts of glacial acetic acid. Into the suspension there are introduced dropwise in the course of 3 hours at 65–70° C., with stirring, 17 parts of diketene. The whole is then further stirred for 3 hours at this temperature, whereupon the reaction mixture is allowed to cool and the reaction product occurring in crystalline form is isolated. (Yield 90 percent.)

The 1-acetoacetylaminoanthraquinone thus obtained is a yellow, crystalline compound of melting point 163–165° C. which is insoluble in water but soluble in glacial acetic acid and pyridine.

*Example 2*

22.3 parts of 2-aminoanthraquinone are suspended in 150 parts of glacial acetic acid. Into the suspension there are introduced dropwise in the course of 3 hours at 65–70° C., with stirring, 26 parts of diketene. Stirring is continued for a further 5 hours at this temperature, whereupon the hot reaction mixture is freed by filtration with suction from a little undissolved material and, after cooling, the crystalline reaction product is isolated. (Yield 72 percent.)

The 2-acetoacetylaminoanthraquinone thus obtained is a dirty yellow crystalline compound of melting point 156–158° C. which is insoluble in water but soluble in glacial acetic acid and pyridine.

*Example 3*

13 parts of 3-chloro-2-aminoanthraquinone are suspended in 125 parts of glacial acetic acid. Into the suspension there are introduced dropwise in the course of 2 hours at 65–70° C., 9.5° parts of diketene. Stirring is then continued for 7 hours at this temperature, whereupon the hot reaction mixture is freed by filtration with suction from undissolved material and, after cooling, the crystalline reaction product isolated from the mother liquor. Yield 26 percent.)

The 3 - chloro - 2 - acetoacetylaminoanthraquinone thus obtained is a grey-green crystalline compound of melting point 195–198° C. which is insoluble in water but soluble in glacial acetic acid and pyridine.

*Example 4*

72 parts of 1:5-diaminoanthraquinone are suspended in 750 parts of glacial acetic acid. Into the suspension, in the course of 2 hours, at 65–70° C., 56 parts of diketene are introduced dropwise with stirring. When the reaction is complete the whole is further stirred for 4 hours at 95° C., thereupon the reaction mixture is allowed to cool and the crystalline reaction product isolated. (Yield 76 percent.)

The di(acetoacetyl) - 1:5 - diaminoanthraquinone thus obtained is a brown red crystalline compound of melting point 181° C. which is insoluble in water but soluble in glacial acetic acid and pyridine.

*Example 5*

103 parts of 1-amino-5-benzoylaminoanthraquinone are suspended in 600 parts of glacial acetic acid. Into this suspension, in the course of 2 hours at 65° C., 28.5 parts of diketene are introduced dropwise. When the reaction is complete, stirring is continued for a further 7 hours at 95° C., whereupon the reaction mixture is allowed to cool and the crystalline reaction product is isolated. (Yield 89 percent.)

The 1 - acetoacetylamino - 5 - benzoylaminoanthraquinone thus obtained is an orange, crystalline compound of melting point 198° C. which is insoluble in water but soluble in glacial acetic acid and pyridine.

*Example 6*

36.5 parts of 1-aminobenzene-4-sulphonic acid morpholide are suspended in 450 parts of glacial acetic acid. Into the suspension, in the course of 1½ hours at 65° C., 14.5 parts of diketene are introduced dropwise, whereby the suspended compound slowly passes into solution. The whole is then further stirred for 4 hours at the same temperature, whereupon, after clarification of the solution, the reaction product is isolated by distilling off the glacial acetic acid under reduced pressure. (Yield 83 percent.)

The 1 - acetoacetylaminobenzene - 4 - sulphonic acid morpholide thus obtained is a white, crystalline compound of melting point 142–144° C. which is insoluble in water but soluble in glacial acetic acid, benzene and alcohol.

*Example 7*

17 parts of diphenylamine are dissolved in 100 parts of 90 percent acetic acid. Into the solution, in the course of 1½ hours at 65° C., 9.5 parts of diketene are introduced dropwise. Then stirring is continued for a further 4 hours at this temperature, whereupon, after clarification of the solution, the acetic acid is distilled off under reduced pressure. The residue is extracted with 50 parts of hot petroleum ether and the insoluble portion recrystallised from a little methyl alcohol. (Yield 70 percent.)

The acetoacetyl-diphenylamine thus obtained is a white crystalline compound of melting point 81.5–82.5° C. which is insoluble in water but of good solubility in glacial acetic acid, methyl alcohol, ethyl alcohol and benzene.

By the application of the same reaction conditions but using glacial acetic acid, the acetoacetyl-diphenylamine is obtained in 90 percent yield.

*Example 8*

65 parts of 4-benzoylaminodiphenylamine are suspended in 250 parts of glacial acetic acid. Into the suspension, in the course of 1½ hours at 65° C., 19 parts of diketene are introduced dropwise, whereby the suspended compound slowly passes into solution. Stirring is then continued for a further 4 hours at this temperature, whereupon, after clarification of the solution, the reaction product is isolated by distilling off the glacial acetic acid under reduced pressure. (Yield 90 percent.)

The acetoacetyl - 4 - benzoylaminodiphenylamine thus obtained is a light grey compound of melting point 136–140° C. which is insoluble in water but soluble in glacial acetic acid, alcohol and toluene.

*Example 9*

85 parts of carbazole are suspended in 600 parts of glacial acetic acid. Into the suspension, in the course of 5½ hours at 65° C., 85 parts of diketene are introduced dropwise, whereby the suspended compound slowly passes into solution. Stirring is then continued for a further 3½ hours at this temperature, thereupon the reaction mixture is allowed to cool and the crystalline reaction product is isolated. (Yield 80 percent.)

The acetoacetylcarbazole thus obtained is a white crystalline compound of melting point 118–120° C. which is insoluble in water but soluble in glacial acetic acid, alcohol and benzene.

*Example 10*

154.2 parts of 1-chloro-2-aminoanthraquinone are suspended in 1680 parts of glacial acetic acid and during 3 hours at 65° C., 101 parts of diketene are introduced dropwise. Stirring is continued for 9 hours at the same temperature, the whole is allowed to cool and the crystalline reaction product is isolated. (Yield 83 percent.)

The 1 - chloro - 2 - acetoacetylaminoanthraquinone thus obtained forms a golden yellow crystalline compound of melting point 181–183° C. which is insoluble in water but soluble in glacial acetic acid and pyridine.

*Example 11*

25.5 parts of 1-aminobenzene-4-sulphonic acid-thiazolyl-(2′)-amide are dissolved in 150 parts of glacial acetic acid and during one hour at 65° C., 9.5 parts of diketene introduced dropwise with stirring. Stirring is continued for 3½ hours at this temperature and the whole is allowed to cool and the crystalline reaction product isolated. (Yield 93 percent.)

The 1 - acetoacetylaminobenzene - 4 - sulphonic acid thiazolyl-(2′)-amide forms a white crystalline compound of melting point 198–201° C. which is insoluble in water but soluble in glacial acetic acid and pyridine.

*Example 12*

84 parts of naphthosultam are suspended in 500 parts of glacial acetic acid and during 2½ hours at 65° C., 68 parts of diketene are introduced dropwise with stirring. After stirring for 7 hours at this temperature the precipitated reaction product is isolated. (Yield 42 percent.)

The acetoacetyl-naphthosultam thus obtained forms a greyish-white crystalline compound of melting point 118–119° C. and is insoluble in water but soluble in glacial acetic acid and pyridine.

What we claim is:

1. A process for the preparation of an N-acetoacetyl compound of a primary anthraquinonyl amine, which comprises heating one mol of the amine with at least one mol of diketene in suspension in 90–100% acetic acid to a temperature of 40–80° C., and thereafter isolating the resultant reaction product.

2. A process according to claim 1, wherein the heating is carried to a temperature of 60–70° C.

3. A process according to claim 1, wherein the heating is carried out in glacial acetic acid.

4. A process according to claim 1, wherein the heating is carried to a temperature of 60–70° C. in glacial acetic acid.

5. A process for the manufacture of 1-aceto-acetyl-aminoanthraquinone, which comprises heating one mol of 1-aminoanthraquinone with at least one mol of diketene in suspension in glacial acetic acid to a temperature of 65–70° C., and thereafter isolating the resultant 1-aceto-acetylaminoanthraquinone.

6. A process for the manufacture of 2-aceto-acetylaminoanthraquinone, which comprises heating one mol of 2-aminoanthraquinone with at least one mol of diketene in suspension in glacial acetic acid to a temperature of 65–70° C., and thereafter isolating the resultant 2-aceto-acetylaminoanthraquinone.

7. A process for the manufacture of 1-chloro-2-acetoacetylaminoanthraquinone, which comprises heating one mol of 1-chloro-2-aminoanthraquinone with at least one mol of diketene in suspension in glacial acetic acid to a temperature of 65–70° C., and thereafter isolating the resultant 1-chloro-2-acetoacetylaminoanthraquinone.

8. A process for the manufacture of di-(acetoacetyl)-1:5-diaminoanthraquinone, which comprises heating one mol of 1:5-diaminoanthraquinone with at least two mols of diketene in suspension in glacial acetic acid to a temperature of 65° C., and thereafter isolating the resultant di-(acetoacetyl)-1:5-diaminoanthraquinone.

9. A process for the manufacture of 1-acetoacetylamino-5-benzoylaminoanthraquinone, which comprises heating one mol of 1-amino-5-benzoylaminoanthraquinone with at least one mol of diketene in suspension in glacial acetic acid to a temperature of 65° C., and thereafter isolating the resultant 1-acetoacetylamino-5-benzoylaminoanthraquinone.

10. A member selected from the group consisting of 1-chloro-2-acetoacetylaminoanthraquinone, 1 - acetoacetylamino-5-bonzoylaminoanthraquinone and di-(acetoacetyl)-1:5-diaminoanthraquinone.

11. 1-chloro-2-acetoacetylaminoanthraquinone.

12. 1-acetoacetylamino - 5 - benzoylaminoanthraquinone.

13. Di-(acetoacetyl)-1:5-diaminoanthraquinone.

References Cited in the file of this patent
UNITED STATES PATENTS 2,108,602    Mannes et al. _____ Feb. 15, 1938
2,152,786    Boese _____ Apr. 4, 1939

OTHER REFERENCES

Fieser & Fieser, Organic Chemistry, 2nd Ed., 1950, D. C. Heath & Co., Boston, Mass., pages 188–189.